Patented July 28, 1942

2,291,208

UNITED STATES PATENT OFFICE 2,291,208

BONDING RUBBER TO FIBERS

Charles F. Brown and Arthur E. Brooks, Nutley, N. J., assignors, by mesne assignments, to United States Rubber Company, New York, N. Y., a corporation of New Jersey No Drawing. Application July 2, 1938, Serial No. 217,221

28 Claims. (Cl. 154—40)

This invention relates to improvements in bonding of rubber to fibrous materials, and more particularly to the provision of an adhesive for bonding solid rubber to artificial silk fabric such as rayon fibers.

Although the use of adhesives for bonding rubber to various materials is well known, the bonding of rubber to rayon is peculiarly difficult, the usual rubber-containing adhesives being useless for the purpose. This is believed to be due primarily to the smooth surfaces of the artificial silk fibers such as rayon, as distinguished from the more ragged surfaces of natural fibers like cotton.

The present invention is concerned primarily with providing an excellent bond between solid rubber and rayon, especially a bond which will maintain an adequate degree of adhesion when subjected to elevated temperatures over long periods, such as are often encountered in the operation of truck and bus tires. It is known that rayon when subjected to aqueous media undergoes swelling, buckling, and reduction of tensile strength; therefore the present invention employs to advantage a non-aqueous medium for the adhesive.

Broadly the adhesive composition comprises solid rubber, carbon black, a soft soluble heat-hardenable phenolic resin, a formaldehyde-yielding substance, and organic solvent. More particularly, the invention further comprises such adhesive compositions additionally comprising a small amount of a phenol such as phenol, cresol, xylenol, etc.

The invention also comprises such compositions, with or without the addition of a phenol, containing as a further addition an inorganic oxidizing agent such as lead chromate, and/or an organic oxidizing agent of a type known to be capable of vulcanizing rubber in the absence of sulphur, such as the nitro-aryl compounds of Ostromuislenski, the quinone-haloid compounds of Fisher U. S. 1,918,328, the quinone-imine compounds of French Patent 806,500. The inorganic oxidizing agent may appropriately be used in amounts varying from 20 to 40% by weight (referred to the rubber), while the organic oxidizing agent is preferably used in such proportion as is suitable for use as a vulcanizing agent, generally from 3 to 5%.

The crude rubber used may be any of the market grades of natural rubber which are commonly available, such as pale crepe, or smoked sheets.

The rubber is preferably broken down, previous to its dissolution in the organic solvent, to a viscosity of less than 50 (Mooney) to give a cement of lower viscosity for any given concentration than is possible with unbroken-down rubber. By incorporating the carbon black in the rubber on the mill, and mixing the product with the solvent in a cement churn, a better dispersion is obtained than by mixing the carbon black into the rubber cement by means of a stirrer.

The phenolic resins are of the type that are alcohol- and acetone-soluble, and are potentially reactive, such as resorcinol-formaldehyde resins, and phenol-formaldehyde or Bakelite resins, which are in a low state of polymerization and hence highly reactive. Such resins are further characterized in that they do not set to a hard film at ordinary room temperatures, but remain relatively soft and pliable. When adding the resins, or mixtures of resins, it is preferably added in alcohol or acetone solution, for example, solutions of about 50% total solids concentration. The reactive resin is preferably used in amounts varying from about 25 to about 100 parts by weight based on the rubber.

In order to activate the desired further polymerization or hardening of the resin, substances liberating reactive methylene groups are added, preferably in a proportion of from about 1 to about 20 parts by weight per 100 parts by weight of reactive resin. Among such substances are formaldehyde, paraformaldehyde, hexamethylene tetramine, or equivalent substance. The development of the remarkable adhesive properties of the present composition is believed to be due in large part to a co-action between the reactive resin, the methylene-containing body, and the carbon black, as we have found that in the absence of either of the two latter ingredients the adhesion of the composition to rayon is practically nil.

It has also been found that the addition to the essential mixture,—i. e. rubber, reactive resin, hardening agent for the reactive resin, carbon black,—of a phenol, or of an inorganic or organic oxidizing agent, for example, lead chromate, chloranil, benzoquinone monoxime, benzoquinone dioxime, quinone-aryl-imine compounds, gives further improvement in the bonding properties of the cements.

Whereas either channel blacks or soft blacks may be used, superior adhesion to rayon is obtained with the channel blacks. The carbon black is preferably used in relatively large amounts, for example from 25 to 100 parts by weight per 100 parts by weight of rubber; ten parts of carbon black have, however, given good results.

Whereas any known rubber solvent or solvents may be used for the adhesive, it is preferred to use a solvent having a relatively high vapor pressure and which is therefore quick drying, for example, 76° Bé. naphtha, a petroleum fraction, gasoline, and the like. The solvent is preferably used in an amount to give 15–30% total solids (rubber, carbon black, reactive resin, hardening agent).

If desired a homogenizing agent such as cyclohexanol, amylacetate, hexaline acetate, "Cellosolve," may advantageously be added to the adhesive, preferably by first adding the homogenizer to the rubber cement, before adding the resin solution and other compounding ingredients.

An outstanding advantage of the present adhesive is that it does not require the use of a primer or base coat, previous to application of the adhesive. Furthermore compared to a rubber-free resin bond between the rayon fabric and the rubber, the present mixed adhesive shows considerably higher flexing results.

The following examples are given in illustration of the invention, the parts being by weight; solvent is added to approximately 17% T. S. in all cements:

Rayon tire cords, suitably spaced and aligned, are dipped in the adhesive, dried on a drum, given a skim coat of rubber by the conventional calender method of coating tire fabric, and built into flexing pads, for testing on the U. S. Rubber flexing machine (J. Ind. Eng. Chem. Anal. Ed., 2, 99 (1930)). The flexing tests are run at room temperatures and at 250° F., and the flexing life, in kilocycles to ply separation, measures the bonding quality of the adhesive.

Since ply separation at high temperatures is a frequent cause of tire failure, the flexing tests run at 250° F. are considered to be a reliable index of the merits of the adhesive.

|  | Example No. |  |  |  |  |  |  |
|---|---|---|---|---|---|---|---|
|  | 1 | 2 | 3 | 4 | 5 | 6 | 7 |
| Ingredients: |  |  |  |  |  |  |  |
| Rubber | 100 | 100 | 100 | 100 | 100 | 100 | 100 |
| Channel black |  | 50 |  | 50 | 50 | 50 | 50 |
| Cyclohexanol (homogenizer) | 10 | 10 | 10 | 10 | 10 | 10 | 10 |
| Resorcinol resin |  |  | 50 | 50 | 50 | 50 | 50 |
| Hexa (hardening agent) | 5 | 5 | 5 |  | 5 | 5 | 5 |
| Cresol |  |  |  |  |  | 5 |  |
| Tetrachlorquinone |  |  |  |  |  |  | 4 |
| Kilocycles flexing: |  |  |  |  |  |  |  |
| Room temperature | 5 | 3 | 12 | 12 | 120 | 162 | 134 |
| 250° F | 3 | 5 | 7 | 7 | 58 | 68 | 65 |

In the above tabulation Examples Nos. 5, 6 and 7 are embodiments of different modifications of the invention. Examples 5, 6 and 7 each contain rubber, black, and resin, and hexa as hardening agent; in addition Example 6 contains cresol, and Example 7 chloranil. Examples 1–4 inclusive illustrate the negligible adhesion obtained when one or more of the essential ingredients is omitted, the flexing life falling far below the minimum of 25 kc. required for satisfactory performance.

The following examples (8, 9) are illustrative of adhesives prepared according to the invention and utilizing soluble reactive condensation products of phenol and formaldehyde as the resin.

|  | Example No. |  |
|---|---|---|
|  | 8 | 9 |
| Ingredients: |  |  |
| Rubber | 100 | 100 |
| Channel black | 50 | 50 |
| Cyclohexanol (homogenizer) | 10 | 10 |
| "Bakelite XR–5948" (reactive resin) | 50 |  |
| "Amberol HH–1" (reactive resin) |  | 50 |
| Hexamethylene tetramine (hardening agent) | 5 | 5 |
| Kilocycles flexing: |  |  |
| Room temperature | 96 | 55 |
| 250° F | 74 | 95 |

"Bakelite" is the trade-mark of phenol aldehyde resins manufactured by the Bakelite Corporation; "Amberol" similarly is an alcohol modified phenol-aldehyde resin trade-mark of the Resinous Products and Chemical Co., Philadelphia.

It is understood that "Bakelite XR–5948" is a cresylic acid-formaldehyde resin, and that "Amberol HH–1" is a phenol-formaldehyde resin modified with butyl alcohol.

The following illustrate the use of various phenols and organic oxidizing agents in the invention: To cement mixes prepared according to the invention and consisting of rubber 100, channel black 50, cyclohexanol 10, resorcinol resin 50, and hexa 5 (parts by weight), and rubber solvent (naphtha), were added further ingredients in the amounts indicated in the following table. The test results on rayon flexing pads made up using the respective compositions are also included.

| Example No. | Added ingredient | Amount | Flexing life in kilocycles at— | |
|---|---|---|---|---|
|  |  |  | Room temp. | 250° F. |
| 10 | Nil (control) | Nil | 113 | 56 |
| 11 | Phenol | 5 | 149 | 64 |
| 12 | Cresol | 5 | 170 | 70 |
| 13 | Chloranil | 4 | 140 | 80 |
| 14 | Benzoquinone-monoxime | 3 | 119 | 66 |
| 15 | Benzoquinone-dioxime | 3 | 151 | 53 |
| 16 | Dinitrobenzene | 5 | 132 | 72 |
| 17 | Trinitrobenzene | 4 | 228 | 29 |
| 18 | Quinone | 4 | 138 | 88 |
| 19 | Quinone-monanil | 4 | 222 | 68 |
| 20 | Quinone-dianil | 4 | 240 | 42 |

In each case the addition of a modifying agent has produced an increase in the flexing life either at room temperature or at 250° F., or at both temperatures.

Whereas the present invention has been developed particularly for rubber-rayon (regenerated cellulose fiber) bonds, it is to be understood that the adhesive may be used to satisfactorily bond rubber to other fibers such as cotton, wool, etc. (natural fibers) as well as other artificial fibers or filaments such as cellulose acetate, and other artificial fibers. The adhesive may be used in the making of composite rubber-fabric articles, used in the construction of tires, belts, etc., or wherever the composite article is required to give continued flexings, and bendings, and especially at elevated temperatures, such as encountered in truck and bus tires, when run for long periods of time on hot roads.

While we have herein disclosed with particularity certain preferred manners of performing our invention, we do not desire to limit ourselves solely thereto, for the precise proportions of the materials utilized may be varied without departing from the spirit and scope of the invention as defined in the appended claims.

Having thus described our invention, what we claim and desire to protect by Letters Patent is:

1. An adhesive composition, suitable for bonding rubber to textile materials, comprising an admixture of rubber, carbon black, a potentially reactive phenol aldehyde resin and a methylene-containing hardening agent therefor, in an organic solvent for the rubber.

2. An adhesive composition, suitable for bonding rubber to textile materials, comprising an admixture of rubber, carbon black, a potentially reactive phenol aldehyde resin and a methylene-containing hardening agent therefor, and an oxidizing agent which is capable of vulcanizing rubber in the absence of sulphur, in an organic solvent for the rubber.

3. An adhesive composition, suitable for bonding rubber to textile materials, comprising an admixture of rubber, carbon black, a potentially reactive phenol aldehyde resin and a methylene-containing hardening agent therefor, and a phenol, in an organic solvent for the rubber.

4. An adhesive composition, suitable for bonding rubber to textile materials, comprising an admixture of rubber, carbon black, a potentially reactive phenol aldehyde resin and a methylene-containing hardening agent therefor, a phenol, and an oxidizing agent which is capable of vulcanizing rubber in the absence of sulphur, in an organic solvent for the rubber.

5. An adhesive composition, suitable for bonding rubber to textile materials, comprising an admixture of rubber, carbon black, a potentially reactive phenol aldehyde resin and a methylene-containing hardening agent therefor, cresol, and tetrachloro-p-benzoquinone, in an organic solvent for the rubber.

6. A process of bonding rubber to textile material which comprises treating the fibers with an adhesive as set forth in claim 1, and then applying the rubber over said adhesive after drying the adhesive coating.

7. A process of bonding rubber to textile material which comprises treating the fibers with an adhesive as set forth in claim 2, and then applying the rubber over said adhesive after drying the adhesive coating.

8. A process of bonding rubber to textile material which comprises treating the fibers with an adhesive as set forth in claim 3, and then applying the rubber over said adhesive after drying the adhesive coating.

9. A process of bonding rubber to textile material which comprises treating the fibers with an adhesive as set forth in claim 4, and then applying the rubber over said adhesive after drying the adhesive coating.

10. A process of bonding rubber to textile material which comprises treating the fibers with an adhesive as set forth in claim 5, and then applying the rubber over said adhesive after drying the adhesive coating.

11. A process of bonding rubber to rayon fibers which comprises treating the rayon fibers with an adhesive as set forth in claim 1, and then applying the rubber over said adhesive after drying the adhesive coating.

12. A process of bonding rubber to rayon fibers which comprises treating the rayon fibers with an adhesive as set forth in claim 2, and then applying the rubber over said adhesive after drying the adhesive coating.

13. A composite rubber and textile fabric article in which rubber is bonded to the fabric by an intermediate coating of an adhesive composition comprising an admixture of rubber, carbon black, a heat-hardened-in-situ phenol aldehyde resin and a methylene-containing hardening agent therefor.

14. A composite rubber and textile fabric article in which rubber is bonded to the fabric by an intermediate coating of an adhesive composition comprising an admixture of rubber, carbon black, a heat-hardened-in-situ phenol aldehyde resin and a methylene-containing hardening agent therefor, and an oxidizing agent which is capable of vulcanizing rubber in the absence of sulphur.

15. A composite rubber and rayon fabric article in which rubber is bonded to the fabric by an intermediate coating of an adhesive composition comprising an admixture of rubber, carbon black, a heat-hardened-in-situ phenol aldehyde resin and a methylene-containing hardening agent therefor, and an oxidizing agent which is capable of vulcanizing rubber in the absence of sulphur.

16. A composite rubber and textile fabric article in which rubber is bonded to the fabric by an intermediate coating of an adhesive composition comprising an admixture of rubber, carbon black, a heat-hardened-in-situ phenol aldehyde resin and a methylene-containing hardening agent therefor, and a phenol.

17. A composite rubber and textile fabric article in which rubber is bonded to the fabric by an intermediate coating of an adhesive composition comprising an admixture of rubber, carbon black, a heat-hardened-in-situ phenol aldehyde resin and a methylene-containing hardening agent therefor, a phenol, and an oxidizing agent which is capable of vulcanizing rubber in the absence of sulphur.

18. A composite rubber and rayon fabric article in which rubber is bonded to the fabric by an intermediate coating of an adhesive composition comprising an admixture of rubber, carbon black, a heat-hardened-in-situ phenol aldehyde resin and a methylene-containing hardening agent therefor, a phenol, and an oxidizing agent which is capable of vulcanizing rubber in the absence of sulphur.

19. A composite rubber and textile fabric article in which rubber is bonded to the fabric by an intermediate coating of an adhesive composition comprising an admixture of rubber, carbon black, a heat-hardened-in-situ phenol aldehyde resin and a methylene-containing hardening agent therefor, cresol, and tetrachloro-p-benzoquinone.

20. A composite rubber and rayon fabric article in which rubber is bonded to the fabric by an intermediate coating of an adhesive composition comprising an admixture of rubber, carbon black, a heat-hardened-in-situ phenol aldehyde resin and a methylene-containing hardening agent therefor.

21. A composite rubber and rayon fabric article in which rubber is bonded to the fabric by an intermediate coating of an adhesive composition comprising an admixture of rubber, carbon black, a heat-hardened-in-situ phenol aldehyde resin and a methylene-containing hardening agent therefor, and an oxidizing agent which is capable of vulcanizing rubber in the absence of sulphur.

22. A composite rubber and rayon fabric article in which rubber is bonded to the fabric by an intermediate coating of an adhesive composition comprising an admixture of rubber, carbon black, a heat-hardened-in-situ phenol aldehyde resin and a methylene-containing hardening agent therefor, an oxidizing agent which is capable of vulcanizing rubber in the absence of sulphur, and a homogenizer.

23. A composite rubber and rayon fabric article in which rubber is bonded to the fabric by an intermediate coating of an adhesive composition comprising an admixture of rubber, carbon black, a heat-hardened-in-situ phenol aldehyde resin and a methylene-containing hardening agent therefor, and a phenol.

24. A composite rubber and rayon fabric article in which rubber is bonded to the fabric by an intermediate coating of an adhesive composition comprising an admixture of rubber, carbon black, a heat-hardened-in-situ phenol aldehyde resin and a methylene-containing hardening agent therefor, a phenol, and an oxidizing agent which is capable of vulcanizing rubber in the absence of sulphur.

25. A composite rubber and rayon fabric article in which rubber is bonded to the fabric by an intermediate coating of an adhesive composition comprising an admixture of rubber, carbon black, a heat-hardened-in-situ phenol aldehyde resin and a methylene-containing hardening agent therefor, a phenol, an oxidizing agent which is capable of vulcanizing rubber in the absence of sulphur, and a homogenizer.

26. A composite rubber and rayon fabric article in which rubber is bonded to the fabric by an intermediate coating of an adhesive composition comprising an admixture of rubber, carbon black, a heat-hardened-in-situ phenol aldehyde resin and a methylene-containing hardening agent therefor, cresol, and tetrachloro-p-benzoquinone.

27. A composite tire cord fabric comprising aligned cords containing rayon fibers having a body of rubber bonded thereto by means of an intermediate coating of an adhesive composition comprising an admixture of rubber, carbon black, a heat-hardened-in-situ phenol aldehyde resin and a methylene-containing hardening agent therefor.

28. A composite tire cord fabric comprising aligned cords containing rayon fibers having a body of rubber bonded thereto by means of an intermediate coating of an adhesive composition comprising an admixture of rubber, carbon black, a heat-hardened-in-situ phenol aldehyde resin and a methylene-containing hardening agent therefor, and an oxidizing agent which is capable of vulcanizing rubber in the absence of sulphur.

CHARLES F. BROWN.
ARTHUR E. BROOKS.